(12) United States Patent
Ohmori et al.

(10) Patent No.: US 6,562,933 B2
(45) Date of Patent: *May 13, 2003

(54) POLYURETHANE RESIN TYPE COMPOSITION FOR SLUSH MOLDING

(75) Inventors: Hideki Ohmori, Kyoto (JP); Yoshitsugu Takai, deceased, late of Kyoto (JP), by Eriko Takai, legal representative; Junzo Ukai, Nagoya (JP); Hideo Nishimura, Toyota (JP); Kazuo Kobayashi, Toyota (JP); Mahito Nomura, Toyota (JP)

(73) Assignees: Sanyo Chemical Industries, Ltd., Kyoto (JP); Toyota Jidosha Kabushiki Kaisha, Toyota (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/406,129

(22) Filed: Sep. 27, 1999

(65) Prior Publication Data

US 2002/0016436 A1 Feb. 7, 2002

(30) Foreign Application Priority Data

Sep. 28, 1998 (JP) .......................... 10-272716

(51) Int. Cl.$^7$ ............................... C08G 18/10
(52) U.S. Cl. ..................... 528/61; 528/79; 528/80; 528/83; 524/366
(58) Field of Search .................. 528/79, 61, 76, 528/83, 80; 524/366

(56) References Cited

U.S. PATENT DOCUMENTS

| 4,311,815 | A |   | 1/1982 | Heine .................. 525/504 |
| 4,956,439 | A |   | 9/1990 | Tong et al. ............. 528/53 |
| 4,990,545 | A | * | 2/1991 | Hourai et al. ........... 521/171 |
| 5,879,596 | A | * | 3/1999 | Roach ................... 264/28 |
| 5,906,704 | A | * | 5/1999 | Matsuura et al. ....... 156/331.4 |
| 6,001,213 | A | * | 12/1999 | Liu .................... 156/310 |
| 6,057,391 | A | * | 5/2000 | Ukai et al. ............ 524/297 |
| 6,177,508 | B1 | * | 1/2001 | Ohmori et al. ......... 524/590 |
| 6,235,830 | B1 | * | 5/2001 | Ohmori et al. ......... 524/500 |

FOREIGN PATENT DOCUMENTS

| DE | 28 40 388 | 3/1980 |
| JP | 45-1474 | 1/1970 |
| JP | 4-255755 | 9/1992 |
| JP | 7-292235 | 11/1995 |
| JP | 8-120041 | 5/1996 |
| WO | WO 97/11980 | 4/1997 |

\* cited by examiner

*Primary Examiner*—Jamas J. Seldleck
*Assistant Examiner*—Melanie D. Bagwell
(74) *Attorney, Agent, or Firm*—Finnegan, Henderson, Farabow, Garrett & Dunner, L.L.P.

(57) ABSTRACT

A composition suitable for slush molding is disclosed. The composition comprises a thermoplastic polyurethane elastomer (A) having a number average molecular weight of 10,000 to 50,000 and mainly comprised of a diol component including an aromatic ring-containing diol and a non-aromatic diisocyanate; a plasticizer (B); and optionally an additive. The composition provides a molded article excellent in durability such as thermal/light aging resistance and chemical resistance, soft touch at low temperature, and appearance.

24 Claims, No Drawings

POLYURETHANE RESIN TYPE COMPOSITION FOR SLUSH MOLDING

FIELD OF THE INVENTION

The present invention relates to a composition for slush molding, more particularly to a slush molding composition capable of producing molded articles suitable for automotive trims such as instrument panels.

BACKGROUND OF THE INVENTION

Slush molding process has been widely practiced for molding various articles as interior component parts of motor vehicles. In this molding, there have been proposed modifications of PVC with flexible thermoplastic polyurethane resin as materials to provide soft touch without a low molecular weight plasticizer, as disclosed in Examined Japanese Patent Publication Nos. S53-29705, S59-39464 and S60-30688.

SUMMARY OF THE INVENTION

It is an object of the present invention to provide a molded article of improved compatibility of plasticizer and soft feel even at low temperature. It is another object of the present invention to provide a molded article of little or reduced fogging problem (formation of oil film of evaporated plasticizer on the automotive front windshield) and suitable for automotive instrument panels. It is a further object of the present invention to provide a molded article having improved pigment dispersibility without causing uneven color even in light color. It is still another object of the present invention to provide a molded article having improved durability such as resistance to chemicals. It is yet another object of the present invention to provide a slush molding composition and a process, capable of producing a molded article as above.

Briefly, these and other objects of this invention as hereinafter will become more readily apparent have been attained broadly by a slush molding composition, comprising a thermoplastic polyurethane elastomer (A) mainly comprised of a diol component including an aromatic ring-containing diol and a non-aromatic diisocyanate, and a plasticizer (B). The thermoplastic polyurethane elastomer (A) usually has a number average molecular weight (measured by GPC, hereinafter referred to as Mn) of about 10,000 to about 50,000.

DETAILED DESCRIPTION OF THE INVENTION

Suitable thermoplastic urethane elastomers (A) according to the present invention include, for example, those disclosed in U.S. Pat. No. 5,906,704, herein incorporated by reference. Illustrative of (A) are ones obtainable by reacting an NCO-terminated urethane prepolymer (a) with a non-aromatic diamine (b1) and an aliphatic monoamine (b2). Said prepolymer (a) is derived from an excess non-aromatic diisocyanate (a1) and a high-molecular diol (a2) having a number average molecular weight of 500 to 10,000 with, optionally, a low-molecular diol (a3). At least a part of the diol component comprising (a2) and optionally (a3) should be aromatic ring-containing diols so as to attain the durability required as slush molding composition.

Suitable non-aromatic diisocyanates (a1) include, for example, ① aliphatic diisocyanates with 2 to 18 carbon atoms (except the carbon atoms in the NCO groups, similarly hereinafter), e.g., ethylene diisocyanate, tetramethylene diisocyanate, hexamethylene diisocyanate (hereinafter referred to as HDI), dodecamethylene diisocyanate, 2,2,4-trimethylhexamethylene diisocyanate, lysine diisocyanate, 2,6-diisocyanatomethyl caproate, bis(2-isocyanatoethyl) fumarate, bis (2-isocyanato ethyl) carbonate, 2-isocyanatoethyl-2,6-diisocyanatohexanoate, and the like; ② alicyclic diisocyanates with 4 to 15 carbon atoms, e.g., isophorone diisocyanate (hereinafter referred to as IPDI), dicyclohexylmethane-4,4'-diisocyanate (hereinafter referred to as hydrogenated MDI), cyclohexylene diisocyanate, methyl cyclohexylene diisocyanate (hereinafter referred to as hydrogenated TDI), bis(2-isocyanato ethyl)-4-cyclohexene, and the like; ③ araliphatic isocyanate with 8 to 15 carbon atoms, e.g., m- and/or p-xylylene diisocyanate (hereinafter referred to as XDI), α, α, α', α'-tetramethyl xylylene diisocyanate (hereinafter referred to as TMXDI), and the like; ④ modified diisocyanates from these, e.g., diisocyanates having a carbodiimide group, an urethodione group, an urethoimine group or an urea group; and ⑤ mixtures of two or more of those compounds.

Among these compounds, preferred are alicyclic diisocyanates, particularly IPDI and hydrogenated MDI.

Suitable high molecular weight diols (a2) include polyester diols, polyether diols and mixtures of two or more of those compounds.

As the aforesaid polyester diol can be cited: ① polycondensates between a dihydric alcohol and a dicarboxylic acid or its ester-forming derivative (acid anhydride, lower alkyl ester with one to 4 carbon atoms, acid halide, and the like); ② ring opening polymerizates of a lactone monomer with a dihydric alcohol as initiator; and mixtures of two or more of those compounds.

Suitable dihydric alcohols include low molecular weight diols and polyether diols. Examples of low molecular weight diols include: aliphatic dihydric alcohols [linear diols such as ethylene glycol, diethylene glycol, 1,3-propanediol, 1,4-butanediol, 1,5-pentanediol, 1,6-hexanediol, 1,8-octanediol, and the like, branched diols such as propylene glycol, neopentyl glycol, 3-methyl-1,5-pentanediol, 2,2-diethyl-1, 3-propanediol, 1,2-butanediol, 1,3-butanediol, and 2,3-butanediol]; alicyclic dihydric alcohols [1,4-bis (hydroxymethyl)cyclohexane diol, 2,2-bis(4-hydroxycyclohexyl)propane and the like]; aromatic ring-containing dihydric alcohols [m-xylene glycol, p-xylylene glycol, alkylene oxide adduct (molecular weight: less than 500) of bisphenols such as bisphenol A, bisphenol S or bisphenol F. alkylene oxide adduct (molecular weight: less than 500) of dihydroxynaphthalene and bis(2-hydroxyethyl) terephthalate]. Suitable polyether diols include the same ones as described below. Mixtures of two or more of these diols may also be used.

Of these compounds preferable are aromatic ring-containing dihydric alcohols(particularly alkylene oxide adducts of bisphenol A), and combinations thereof with aliphatic dihydric alcohols or alicyclic dihydric alcohols.

Examples of the dicarboxylic acid or its ester-forming derivative in aforesaid ① include: aliphatic dicarboxylic acids with 4 to 15 carbon atoms such as succinic, adipic, sebacic, glutaric, azelaic, maleic and fumaric acids; aromatic dicarboxylic acids with 8 to 12 carbon atoms such as terephthalic and isophthalic acids; their ester-forming derivatives such as acid anhydrides, lower alkyl esters (e.g., dimethyl ester, diethyl ester), acid halides (e.g., acid chloride); and mixtures of two or more of these compounds. It is preferable to use aromatic dicarboxylic acids of these compounds in order to introduce an aromatic-ring into (A).

Examples of the lactone monomer in aforesaid ② include γ-butyrolactone, ε-caprolactone, γ-valerolactone and mixtures of two or more of these compounds.

As the aforesaid polyether diol can be cited alkylene oxide adducts of dihydric phenols.

Among the dihydric phenols are bisphenols, e.g., bisphenol A bisphenol F and bisphenol S, and monocyclic phenols e.g., catechol and hydroquinone.

Suitable alkylene oxides include ones containing 2–8 carbon atoms, for example, ethylene oxide (hereafter, referred to as "EO"), propylene oxide (hereafter, referred to as "PO"), 1,2-butylene oxide, 1,3-butylene oxide, 1,4-butylene oxide, 2,3-butylene oxide, styrene oxide, α-olefin oxide with 5 to 10 or more carbon atoms, epichlorohydrin, and combinations of two or more of these compounds, which may be added blockwise and/or randomwise.

Of those polyether diols, preferable are oxyalkylated dihydric phenols, and particularly oxyethylated bisphenols.

Of those high molecular weight diols (a2), preferable are polyester diols, more preferable condensed polyester diols derived from at least one aromatic ring-containing dihydric alcohol and at least one aromatic dicarboxylic acid, particularly preferable a condensed polyester diol derived from an alkylene oxide (particularly EO and/or PO) adduct of bisphenol A and iso- and/or terephthalic acid.

(a2) generally has an Mn of 500 to 10,000, preferably 800 to 5,000, more preferably 1,000 to 3,000. Soft touch is not obtained in case the number average molecular weight is lower than 500, while the required strength is not attained when it is higher than 10,000.

Mn used herein can be calculated on the basis of a calibration curve obtained from a molecular weight standard sample such as polystyrene using gel permeation chromatography (GPC).

As the low molecular weight diol (a3) in combination with (a2) as necessary, the compounds cited as starting materials for the aforesaid polyester diols can be used. Preferable as (a3) are aliphatic diols and oxyalkylated bisphenols, particularly oxyalkylated bisphenol A.

The molar ratio of the respective constituent parts making up the NCO-terminated urethane prepolymer (a) before producing the elastomer (A) to 1 mole of (a1) is this: (a2) generally 0.1 to 0.5 mole, and preferably 0.2 to 0.4 mole; (a3) generally 0 to 0.2 mole, and preferably 0.05 to 0.15 mole.

Equivalent ratio of NCO/OH is usually 1.5–2, particularly 1.7–1.9.

The content of free isocyanate group in the urethane prepolymer (a) is generally one to 10 wt %, preferably 3 to 6 wt %.

Suitable non-aromatic diamines (b1) include, for example, cycloaliphatic diamines containing 4–15 carbon atoms, such as 4,4'-diamino-3,3'-dimethyldicyclohexylmethane, 1,4-diaminocyclohexane, isophoronediamine; aliphatic diamines containing 2–18 carbon atoms, such as ethylenediamine, hexamethylenediamine; araliphatic diamines containing 8–15 carbon atoms, such as xylylenediamine, α, α, α', α'-tetramethylxylylenediamine; and mixtures of two or more of these compounds. Among these compounds preferred are cycloaliphatic diamines and aliphatic diamines, particularly isophoronediamine (hereinafter referred to as IPDA) and hexamethylenediamine.

Suitable monoamine (b2) include monoalkylamines and dialkylamines, containing 1–8 carbon atoms in the alkyl group, such as methylamine, ethylamine, n- and i-propylamines, n- and i-butylamines, dimethylamine, diethylamine, di-n- and -i-propylamines, di-n- and i-butylamines and the like; mono- and di-alkanolamines, containing 2–4 carbon atoms in the hydroxyalkyl group, such as monoethanolamine, diethanolamine and the like; and mixtures of two or more of these compounds. Among these compounds, preferred are dialkylamines, particularly di-n-propylamine and di-n-butylamine.

Molar ratio of (b1)/(b2) is generally 20/1–5/1, particularly 15/1–8/1.

In the above reaction for formation of (A), an equivalent ratio of the amino group of (b1) to the isocyanate group of (a) is usually from 0.2 to 0.7, and preferably from 0.3 to 0.6, while an equivalent ratio of the amino group of (b2) to the isocyanate group of (a) is usually from 0.02 to 0.2, and preferably from 0.05 to 0.15.

Preparation methods and conditions of (a) and (A) include those disclosed in U.S. Pat. No. 5,906,704., herein incorporated by reference.

In practice of the present invention, the thermoplastic polyurethane elastomer (A) is used in powder-form. Suitable methods for producing powder of (A) are not specifically limited but include, for example, the following methods:

① method of grinding blocked or pelletized (A) through techniques, such as freeze-grinding or icing-grinding;

② method of forming a non-aqueous dispersion of (A) in an organic solvent which does not dissolve (A) (e.g. n-hexane, cyclohexane, n-heptane, etc.) and separating (A) from the non-aqueous dispersion with drying (e.g. method described in Unexamined Japanese Patent Publication No. H04-255755, etc.); and ③ method of preparing a water dispersion of (A) in water containing a dispersant and separating (A) from the water dispersion with drying (e.g. methods described in Unexamined Japanese Patent Publication Nos. H07-133423 and H08-120041).

Among them, the method of ③ is preferred in that a powder having a desired particle size can be obtained without using a large amount of the organic solvent.

Mn of (A) is generally 10,000 to 50,000, and preferably 15,000 to 30,000. If Mn is less than 10,000, no molded article having the required breaking strength can be obtained. But Mn higher than 50,000 would increase the hot-melt viscosity, affecting the moldability.

The content of aromatic-ring in said (A) is generally from 5 to 50 wt % on the total weight of (A), and preferably from 10 to 40 wt %. When the content is less than 5 wt %, the molded aiticle can have no satisfactory durability. The content exceeding 50 wt % would increase the hot-melt viscosity, affecting the moldability.

The heat-softening initiation temperature (hereinafter referred to as HIT) of (A) is generally from 120 to 200° C., and preferably from 130 to 150° C. When the HIT is lower than 120° C., the blocking between particles of the resin is liable to occur. On the other hand, when the HIT is higher than 200° C., it becomes sometimes difficult to obtain a molded article having a smooth surface.

The term "HIT" used in the present specification can be measured in accordance with the method (TMA) described in JIS K-7196 (1991).

Suitable plasticizers (B) include those mentioned as examples of solbilizer in U.S. Pat. No. 3,489,723, herein incorporated by reference. Exemplary of (B) are aromatic monocarboxylic acid diesters of polyalkylene glycol; phthalic acid esters, e.g., dibutyl phthalate, dioctyl phthalate, butyl benzyl phthalate, di-isodecyl phthalate; aliphatic dibasic acid esters, e.g., di-2-ethyl hexyl adipate, 2-ethyl hexyl sebacate; trimellitate esters, e.g., tri-2-ethyl hexyl trimellitate, tri-ocytl trimellitate ; fatty acid esters, e.g., butyl oleate; aliphatic phosphates, e.g., trimethyl phosphate, triethyl phosphate, tributyl phosphate, tri-2-ethyl hexyl phosphate, tributoxy phosphate; aromatic phosphates, e.g., triphenyl phosphate, tricresyl phosphate, trixylenyl phosphate, cresyl diphenyl phosphate, xylenyl diphenyl phosphate, 2-ethyl hexyl diphenyl phosphate, tris(2,6-dimethyl phenyl)phosphate; halogenated aliphatic phosphates, e.g., tris(chloroethyl)phosphate, tris(f-chloropropyl)phosphate, tris(dichloropropyl)phosphate, tris (tribromoneopentyl)phosphate. Those compounds are used alone or as a mixture of two or more thereof.

Among these compounds mentioned as example of said plasticizer (B), preferred are such aromatic monocarboxylic acid esters of polyalkylene glycol (Bi) as ones expressed by the following general formula (1).

$$R^1COO\text{—}[A\text{—}O\text{—}]_n\text{—}COR^2 \tag{1}$$

In the formula, $R^1$ and $R^2$ represent the same or different aromatic monocarboxylic acid residues from each other, A represents an alkylene group with two to four carbon atoms, and n is an integer of two to 25.

Said residues $R^1$ and $R^2$ can be independently selected from phenyl group and alkyl- and/or halo-substituted phenyl group. Examples of $R^1$ and $R^2$ include phenyl group; and aromatic hydrocarbon groups nuclear-substituted (substitution degree: 1 to 3) with one or more alkyl groups having 1 to 10 carbon atoms and/or halogens (e.g. Cl, Br, etc.), such as toluyl, xylyl, 4-butylphenyl, 2,4-dibutylphenyl, 2-methyl-4-chlorophenyl, and nonylphenyl groups, etc.

Examples of suitable A include straight-chain or branched alkylene groups having 2 to 4 carbon atoms (e.g. ethylene group, 1,2- and 1,3-propylene group, 1,2-, 1,3-, 2,3- and 1,4-butylene groups, etc.) and alkylene groups substituted with a halogen (e.g. 1-chloromethylethylene group, 1-bromomethylethylene group, etc.).

Among them, preferred examples are those wherein $R^1$ and 10 $R^2$ each independently represents a phenyl group or an C1–10 alkylphenyl group and A represents an alkylene group (particularly ethylene group).

In the above general formula (1), n is usually from 2 to 25, preferably from 3 to 15, and more preferably from 3 to 10. When n exceeds 25, the solidification point exceeds 0° C. and, therefore, soft feel of the resulting slush molded article at low temperature is lowered. On the other hand, when n is less than 2, the boiling point is smaller than 200° C. and, therefore, fogging tends to occur.

Among said (B1), especially preferred are the compounds expressed by the following general formulas (2) and (3).

$$PhCOO\text{—}[CH_2CH_2\text{—}O\text{—}]_{3-10}\text{—}COPh \tag{2}$$

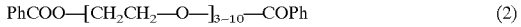

$$PhCOO\text{—}[PPG]_{3-10}\text{—}COPh \tag{3}$$

"Ph" in the formulas (2) and (3) represents phenyl group, and [PPG] represents the residue of polypropylene glycol containing 3–10 oxypropylene units. The most preferred is dibenzoate of polyethylene glycol having Mn of about 200 (hereinafter referred to as PEG200 dibenzoate).

The method of producing the above aromatic carboxylic acid diester (B1) is not specifically limited but includes, for example, (1) method of heating an aromatic monocarboxylic acid or its lower C1–4 alkyl ester and a polyalkylene glycol under reduced pressure and removing the produced water or alcohol and (2) method of reacting an anhydride of an aromatic monocarboxylic acid with a polyalkylene glycol, neutralizing excess monocarboxylic acid and removing it by extraction.

(B1) is used alone or in combination with other one or more plasticizers. When using in combination, the amount of (B1) contained in (B) is not less than 50% by weight, and preferably not less than 70% by weight, because good low-temperature physical properties and fogging resistance of the slush molded article are obtained.

In the slush molding composition of the present invention, the quantity to be added to the polyurethane elastomer (A) of the plasticizer (B) per 100 parts, by weight, of (A) is generally 2 to 80 parts by weight, and preferably 5 to 50 parts by weight.

If (B) is less than 2 part by weight, the melt viscosity in molding will rise, resulting faulty molding. If the addition exceeds 80 parts by weight, on the other hand, (B) will bleed out on the molded skin surface in a change with passage of time.

As the additive suitable in the present invention can be cited pigment, stabilizer and other additives.

The pigments are not particularly restricted, and known organic pigments and/or inorganic pigments can be used. The content of pigments is generally 0.01 to 5 parts by weight per 100 parts by weight of (A).

Among the suitable organic pigments are, for example, insoluble azo pigments, soluble azo pigments, copper phthalocyanine pigments and quinacridone pigments. The inorganic pigments include, for example, chromates, ferrocyanide compounds, metal oxides, sulfide selenium compounds, metallic salts (e.g., sulfate, silicate, carbonate, phosphate), metallic powder and carbon black.

The stabilizers are not particularly restricted, and known antioxidants and/or ultraviolet absorbents can be used. The content of stabilizers is generally 5 parts by weight or less per 100 parts by weight of (A).

Among the suitable antioxidants are hindered phenols such as 2,6-di-t-butyl-p-cresol and butylhydroxyl anisole; bisphenols such as 2,2'-methylenebis(4-methyl-6-t-butylphenol); and phosphorus compounds such as triphenyl phosphite and diphenyl isodecyl phosphite.

Among the ultraviolet absorbents are benzophenones such as 2,4-dihydroxybenzophenone and 2-hydroxy-4-methoxybenzophenone; benzotriazoles such as 2-(2'-hydroxy-5'-methylphenyl)benzotriazole; salicylates such as phenyl salicylate; and hindered amines such as bis(2,2,6,6-tetramethyl-4-piperidyl)sebacate.

The other additives contained, as necessary, in the slush molding composition of the present invention include blocking inhibitor, releasing agent, thermal resistant stabilizer, flame retarder and the like.

The following methods of preparing the slush molding composition of the present invention are given by way of example, but not limited thereto by any means.

①: A powder of (A), (B) and the additives are blended in a lump in a mixer.

②: (B) and the additives are first blended, and then mixed with a powder (A).

③: At an optional stage during the production of the powder of (A), (B) and part or all of additives are previously contained.

Of those methods, preferable is the method ② in that the preparing process is simplified.

Powder mixing apparatuses which are used in preparing the slush molding composition of the present invention are not restricted in particular, and known mixers can be used. Among suitable powder mixing apparatuses are high-speed shear ones, for example, fluid mixers such as a Henschel mixer (trade name), and low-speed ones such as a Nauta mixer and a planetary mixer. Preferred is a Henschel mixer.

The slush molding composition of the present invention is applied in the form of powder. The powder has an average particle diameter of generally 50 to 400 µm, preferably 100 to 300 µm, more preferably 130 to 200 µm. If powder has an average particle diameter less than 50 µm, then flowability of the powder will be poor, with the powder failing to be introduced into narrow parts of the mold, resulting in faulty molding. With powder having a diameter larger than 400 µm, on the other hand, pin holes can be caused on the molded surface skin.

Another point is that fine particles with a particle diameter of less than 100 µm is contained in the powder in an amount generally not more than 50 percent by weight, and preferably not more than 30 percent by weight. If the percentage of the particles less than 100 µm in particle diameter exceeds 50 percent by weight, dusting will be caused and the powder will not flow well into the narrow areas in the mold, resulting in faulty molding.

The repose angle of the powder is usually not more than 35°, and preferably not more than 33°, while the spatula angle is usually not more than 50°, and preferably not more than 40°. When the repose angle and spatula angle are not within the above range, the flowability of the powder becomes inferior and it becomes sometimes difficult to mold because the narrow portions of the mold are not filled with powder on slush molding.

The average particle diameter mentioned here is defined as a value of 50% pass particle diameter expressed in the sieve opening through which 50 percent by weight of the sample passes as measured by particle size distribution meter, e.g., TUBUTEC manufactured by LASENTEC LTD. The repose angle and spatula angle are defined as values measured by powder tester manufactured by HOSOKAWA MICRON LTD.

Molded article made of the slush molding composition of the present invention is very useful as automobile interior material, for example, for instrument panel and also applicable to other molded articles such as sofa surface skin and other interior furniture.

DESCRIPTION OF THE PREFERRED EMBODIMENTS

Now the present invention will be described in more detail by the following examples but is by no means restricted thereto. In the following description, it is understood, part or parts mean part or parts by weight and percent denotes percent by weight. The raw materials used are supplied by the following manufacturers under the following brand-name.

[Raw material//Brand-name//Manufacturer]

EO (2 mol) adduct of bisphenol A//Newpole BPE-20T//SANYO CHEMICAL INDUSTRIES, LTD.

Polyethylene adipate diol//SANESTOR 2620//SANYO CHEMICAL INDUSTRIES, LTD.

Polyvinyl alcohol//PVA-235//KURARAY CO.,LTD.

Blocking inhibitor (finely powdered silica)//SILYSIA 978//FUJI SILYSIA CHEMICAL INDUSTRIES, LTD.

Light stabilizer//DIC-TBS//DAINIPPON INK AND CHEMICALS, INC.

Titanium oxide//TIPAQUE R-820//ISHIHARA SANGYO KAISHA, LTD.

PREPARATION EXAMPLE 1

In a four-necked flask equipped with a stirrer and a thermometer, 388 parts of dimethyl isophthalate and 790 parts of EO (2 mol) adduct of bisphenol A were charged and homogeneously mixed at 120° C. Then, 0.5 parts of zinc acetate was charged and the mixture was subjected to condensation esterification by heating to 200° C. under reduced pressure of 5 mmHg to obtain an aromatic ring-containing polyester diol (hereinafter referred to as "Aromatic polymer diol 1") having Mn of about 2,000 and a hydroxyl value of 55.

PREPARATION EXAMPLE 2

In the same flask as above, 842 parts of dimethyl isophthalate and 436 parts of 1,4-butanediol were charged and homogeneously mixed at 120° C. Then, 0.5 parts of zinc acetate was charged and the mixture was reacted at 160° C. under normal pressure for 2 hours. Subsequently, the pressure was reduced with heating gradually and the resulting mixture was subjected to condensation esterification at 200° C. under 5 mmHg for 2 hours to obtain an aromatic ring-containing polyester diol ("Aromatic polymer diol 2") having Mn of about 2,100 and a hydroxyl value of 53.

PREPARATION EXAMPLE 3

In the same flask as above, 878 parts of "Aromatic-ring-containing polymer diol 1" was charged and molten at 110 C. Subsequently, 122 parts of hydrogenated MDI was charged and the mixture was reacted at 110° C. for 6 hours to obtain an NCO-terminated urethane prepolymer ("Prepolymer 1") containing 3.6% of free isocyanate group.

PREPARATION EXAMPLE 4

In the same flask as above, 405 parts of "Aromatic polymer diol 1", 405 parts of polyethylene adipate diol having Mn of 2,000 and a hydroxyl value of 55, and 40 parts of EO (2 mol) adduct of bisphenol A were charged and homogeneously mixed at 120° C. Subsequently, 150 parts of hydrogenated MDI was charged and the mixture was reacted at 110° C. for 8 hours to obtain an NCO-terminated urethane prepolymer ("Prepolymer 2") containing 3.1% of free isocyanate group.

PREPARATION EXAMPLE 5

In the same flask as above, 890 parts of "Aromatic polymer diol 2" was charged and molten at 120° C. Subsequently, 110 parts of IPDI was charged and the mixture was reacted at 120° C. for 4 hours to obtain an NCO-terminated urethane prepolymer ("Prepolymer 3") containing 3.8% of free isocyanate group.

PREPARATION EXAMPLE 6

In the same flask as above, 400 parts of "Aromatic polymer diol 2", 400 parts of polyethylene adipate diol having Mn of 2,000 and a hydroxyl value of 55, and 55 parts of bisphenol A ethylene oxide (2 mol) adduct were charged and mixed homogeneously at 120° C. Subsequently, 145 parts of IPDI was charged and the mixture was reacted at 110° C. for 8 hours to obtain an NCO-terminated urethane prepolymer ("Prepolymer 4") containing 3.5% of free isocyanate group.

PREPARATION EXAMPLE 7

In the same flask as above, 810 parts of polyethylene adipate diol having Mn of 2,000 and a hydroxyl value of 55, and 25 parts of 1,4-butanediol were charged. Subsequently, 165 parts of IPDI was added and the mixture was reacted at 110° C. for 10 hours to obtain an NCO-terminated urethane prepolymer ("Prepolymer 5") containing 3.3% of free isocyanate group.

PREPARATION EXAMPLE 8

In the same flask as above, 90 parts of "Aromatic polymer diol 2", 730 parts of polyethylene adipate diol having Mn of 2,000 and a hydroxyl value of 55, and 25 parts of 1,4-butanediol were charged and mixed homogeneously at 120° C. Subsequently, 155 parts of IPDI was added and the mixture was reacted at 110° C. for 8 hours to obtain an NCO-terminated urethane prepolymer ("Prepolymer 6") containing 3.1% of free isocyanate group.

PREPARATION EXAMPLE 9

220 parts of "Prepolymer 1" was placed in a beaker, followed by adding thereto 750 parts of a dispersion medium comprising water and 3 parts of polyvinyl alcohol dissolved therein. The resulting mixture was then stirred for one minute with an ultra disperser (manufactured by YAMATO SCIENTIFIC LTD.) at 9,000 rpm.

The mixture was transferred into a four-necked flask mounted with a stirrer and a thermometer, and 27.5 parts of IPDA and 2.5 parts of dibutyl amine were added thereto under stirring and allowed to react for 10 hours at 50° C. The reaction product was then filtered and dried to obtain a powdery urethane elastomer (F1) having Mn of 25,000 (by GPC, similarly hereinafter), average particle diameter of 150 $\mu$m and HIT of 145° C. (by differential thermal analysis, similarly hereinafter). The content of the aromatic ring in the urethane elastomer was 38.4%. The elastomer (F1) was mixed with one part of blocking inhibitor and 0.5 part of light stabilizer to prepare an urethane elastomer powder.

PREPARATION EXAMPLES 10–14

Preparation Example 9 was repeated except that the kind of prepolymer and the amounts of prepolymer, IPDA and dibutylamine were varied as follows to prepare powdery urethane elastomers (F2) to (F6) and urethane elastomer powders mixed with blocking inhibitor and light stabilizer.

Mn, average particle diameter, HIT and aromatic ring content of the powdery urethane elastomers (F1) to (F6) are as follows.

| Preparation Example | 9 | 10 | 11 | 12 | 13 | 14 |
|---|---|---|---|---|---|---|
| Prepolymer No. | 1 | 2 | 3 | 4 | 5 | 6 |
| Prepolymer, parts | 220 | 223 | 217 | 218 | 225 | 223 |
| IPDA, parts | 27.5 | 24.9 | 30.4 | 29.6 | 22.7 | 24.9 |
| Dibutylamine, parts | 2.5 | 2.1 | 2.6 | 2.4 | 2.3 | 2.1 |
| Elastomer No. | (F1) | (F2) | (F3) | (F4) | (F5) | (F6) |
| Mn, × 1,000 | 25 | 26 | 23 | 28 | 24 | 25 |
| Average particle diameter, $\mu$m | 150 | 140 | 165 | 125 | 150 | 160 |
| HIT, ° C. | 145 | 147 | 146 | 148 | 138 | 142 |
| Aromatic ring content, % | 38.4 | 17.7 | 26.2 | 11.8 | 0 | 2.6 |

EXAMPLE 1

100 parts of (F1), 15 parts of PEG200 dibenzoate as plasticizer (B) and 1 part of titanium oxide as additive were placed in a Henschel mixer and mixed for one minute at 200 rpm.

After that, the mixture was allowed to mature for one hour at 100° C. and then to cool to 40° C. Then 1 part of blocking inhibitor was added to obtain a slush molding composition (S1) of the present invention. The average particle diameter, measured by particle size distribution meter TUBTEC manufactured by LASENTEC LTD. (similarly hereinafter), of (S1) was 160 $\mu$m, and the content of fine particles less than 100 $\mu$m in diameter was 18%.

EXAMPLE 2

Another slush molding composition (S2) of the present invention was obtained in the same procedure as in Example 1, except for substituting (F2) for (F1). The average particle diameter of (S2) was 165 $\mu$m, and the content of fine particles less than 100 $\mu$m in diameter was 15%.

EXAMPLE 3

Still another slush molding composition (S3) of the present invention was obtained in the same procedure as in Example 1, except for substituting (F3) for (F1). The average particle diameter of (S3) was 176 $\mu$m, and the content of fine particles less than 100 $\mu$m in diameter was 15%.

EXAMPLE 4

A further slush molding composition (S4) of the present invention was obtained in the same procedure as in Example 1, except for substituting (F4) for (F1). The average particle diameter of (S4) was 174 $\mu$m, and the content of fine particles less than 100 $\mu$m in diameter was 16%.

COMPARATIVE EXAMPLE 1

A slush molding composition (S5) for comparison was obtained in the same procedure as in Example 1, except for substituting (F5) for (F1). The average particle diameter of (S5) was 165 $\mu$m, and the content of fine particles less than 100 $\mu$m in diameter was 18%.

COMPARATIVE EXAMPLE 2

A slush molding composition (S6) for comparison was obtained in the same procedure as in Example 1, except for substituting (F6) for (F1). The average particle diameter of (S6) was 177 $\mu$m, and the content of fine particles less than 100 $\mu$m in diameter was 13%.

Testing 1

The compositions (S1), (S2), (S3), (S4), (S5) and (S6) obtained in Examples 1 to 4 and Comparative examples 1 to 2 were tested. Each sample was brought into contact with a mold heated to 220° C. for 30 seconds. After hot melting, the unmelted powder was removed out of the melt, which was left standing for one minute at room temperature and cooled in water to give a molded sheet. The molded sheets thus obtained were put to the following tests to examine the properties. The test results are summarized in Table 1.

Chemical resistance: ethanol, gasoline and a 1% NAOH aqueous solution were respectively dropped, by a few drops each, onto a surface of a molded sheet with dropping pipettes and the molded sheet was left in an air circulating drier fox 1 hour at room temperature and in succession, for another 1 hour at 80° C. Thereafter, portions of the surface of the molded sheet onto which the chemicals had been dropped were swept with wet bleached cotton pieces and a change in appearance of each portion was visually judged according to the following evaluation criteria:

○: no change is observed,

Δ: no dissolution is observed though a slight change is recognized, and x: resin is partially dissolved and a clear change is recognized.

Breaking strength and elongation (25° C.), low-temperature breaking strength (−35° C.), hardness: ASTM-D638.

TABLE 1

|  |  | Example | | | | Comparative example | |
|---|---|---|---|---|---|---|---|
|  |  | 1 | 2 | 3 | 4 | 1 | 2 |
| Composition | | S1 | S2 | S3 | S4 | S5 | S6 |
| Aromatic-ring content % | | 38.4 | 17.7 | 26.2 | 11.8 | 0 | 2.6 |
| Chemical Resistance | EtOH | ○ | ○ | ○ | ○ | X | Δ |
|  | Gasoline | ○ | ○ | ○ | ○ | Δ | Δ |
|  | NaOH aq. | ○ | ○ | ○ | ○ | Δ | ○ |
| Elongation, % | | 220 | 240 | 230 | 310 | 350 | 230 |
| Breaking strength, MPa | | 19 | 15 | 17 | 17 | 10 | 12 |
| Low-temp. Elongation, % | | 130 | 125 | 140 | 130 | 160 | 105 |
| Low-temp. Breaking strength, MPa | | 22 | 20 | 24 | 24 | 25 | 25 |
| Hardness, Shore A | | 85 | 83 | 75 | 75 | 73 | 85 |

Table 1 shows that the compositions of Examples are superior to the comparative example in chemical resistance.

Testing 2

Molded sheets were prepared from (S1) to (S6) within the mold in accordance with Testing 1, followed by introducing thereinto urethane foam-forming components of the following formulation to obtain urethane foams with the surface layers of the respective molded sheets (S1) to (S6).

Formulation: 95 parts of an EO-chipped polyoxypropylene triol having Mn of 5,000, 5 parts of triethanol amine, 2.5 parts of water, 1 part of triethylamine and 61.5 parts of a polymeric MDI.

Those moldings were heat treated in a circulating-air drier for 500 hours at 120° C. Then the urethane foams were removed from the respective molded sheets, which were then put to the following tests of the following physical properties. The test results are shown in Table 2.

Elongation (25° C., −35° C.): ASTM-D638
Appearance: Visual evaluation based on the following standard
○; No change is observed.
x; A change is observed.

TABLE 2

|  | Example | | | | Comparative example | |
|---|---|---|---|---|---|---|
|  | 1 | 2 | 3 | 4 | 1 | 2 |
| Composition | S1 | S2 | S3 | S4 | S5 | S6 |
| Aromatic-ring content, % | 38.4 | 17.7 | 26.2 | 11.8 | 0 | 2.6 |
| Elongation, % after heating (25° C.) | 180 | 170 | 160 | 160 | 10 | 40 |
| Elongation, % after heating (−35° C.) | 110 | 130 | 100 | 120 | 0 | 30 |
| Appearance | ○ | ○ | ○ | ○ | X | X |

Testing 3

The urethane foams with the respective surface layers—(S1) to (S6)—obtained in Testing 2 were tested in a carbon arc fadeometer for 400 hours at a black panel temperature of 83° C. Then the urethane foams were removed from the respective molded sheets, which were then put to the following tests of the following physical properties. The test results are shown in Table 3.

Elongation (25° C., −35° C.): ASTM-D638
Appearance: Visual evaluation based on the following standard
○; No change is observed.
x; A change is observed.

TABLE 3

|  | Example | | | | Comparative example | |
|---|---|---|---|---|---|---|
|  | 1 | 2 | 3 | 4 | 1 | 2 |
| Composition | S1 | S2 | S3 | S4 | S5 | S6 |
| Aromatic-ring content, % | 38.4 | 17.7 | 26.2 | 11.8 | 0 | 2.6 |
| Elongation, % subjected to fademeter (25° C.) | 130 | 170 | 150 | 140 | 10 | 50 |
| Elongation, % subjected to fademeter (−35° C.) | 105 | 105 | 120 | 110 | 0 | 0 |
| Appearance | ○ | ○ | ○ | ○ | X | X |

As shown in Tables 2 and 3, the molded sheets from the compositions of the present invention is large in elongation as compared with the comparative one. It is clear, therefore, that the invention compositions are excellent in thermal aging resistance and light aging resistance.

What is claimed as new and desired to be secured by Letters Patent is:

1. A molded article obtained by slush-molding a composition comprising:
a thermoplastic polyurethane elastomer (A) having a number average molecular weight of about 10,000 to about 50,000 and mainly comprised of a diol component including an aromatic ring-containing diol and a non-aromatic diisocyanate; and a plasticizer (B); with or without an additive, wherein (A) is obtained by reacting an NCO-terminated urethane prepolymer (a) with a non-aromatic diamine (b1) and an aliphatic monoamine (b2); said urethane prepolymer (a) having been derived from an excess non-aromatic diisocyanate (a1) and a diol component; said diol component comprising a high-molecular weight polyester diol (a2) of a dihydric alcohol with an aromatic dicarboxylic acid and having a number average molecular weight of about 500 to about 10,000, with a low-molecular weight diol (a3), wherein (A) contains aromatic rings in an amount of 5 to 50% by weight.

2. The molded article of claim 1, wherein (A) contains aromatic rings in an amount of 10 to 40% by weight.

3. The molded article of claim 1, wherein the dihydric alcohol is an oxyalkylene ether of a dihydric phenol, selected from the group consisting of bisphenol A, bisphenol F, bisphenol S, catechol and hydroquinone.

4. The molded article of claim 1, wherein polyurethane elastomer (A) has a heat softening initiation temperature of 120 to 200° C.

5. The molded article of claim 1, wherein plasticizer (B) comprises an aromatic monocarboxylic acid ester of a polyalkylene glycol of the general formula

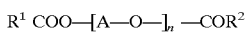

in which $R^1$ and $R^2$ represent the same or different aromatic monocarboxylic acid residues from each other, A represents an alkylene group with two to four carbon atoms, and n is an integer of two to 25.

6. The molded article of claim 5, wherein $R^1$ and $R^2$ are independently selected from the group consisting of phenyl groups, alkyl-substituted phenyl groups and halo-substituted phenyl groups; and n is an integer of two to 18.

7. The molded article of claim 1, wherein plasticizer (B) is contained in an amount of from 2 to 80 parts by weight, per 100 parts by weight of (A).

8. The molded article of claim 1, wherein the composition is in the form of a powder having an average particle diameter of 50 to 400 μm and containing not more than 50% by weight of fine particles less than 100 μm.

9. The molded article of claim 1, wherein the non-aromatic diisocyanate (a1) is selected from the group consisting of aliphatic diisocyanates, alicyclic diisocyanates, araliphatic diisocyanates, modified diisocyanates from these, and mixtures of two or more of these compounds.

10. The molded article of claim 1, wherein (a) is derived from 1 mole of (a1) with 0.1 to 0.5 mole of (a2) and 0.05 to 0.2 mole of (a3).

11. The molded article of claim 5, wherein n is an integer of 3 to 15.

12. The molded article of claim 8, wherein the powder has a repose angle of not more than 35° and a spatula angle of not more than 50°.

13. The molded article of claim 1, wherein the additive is at least one selected from the group consisting of pigments, stabilizers, blocking inhibitors, releasing agents and flame retardants.

14. A molded article obtained by slush-molding a composition comprising:
a thermoplastic polyurethane elastomer (A) having a number average molecular weight of about 10,000 to about 50,000 and mainly comprised of a diol component including an aromatic ring-containing diol and a non-aromatic diisocyanate; and a plasticizer (B); with or without an additive, wherein (A) is obtained by reacting an NCO-terminated urethane prepolymer (a) with a non-aromatic diamine (b1) and an aliphatic monoamine (b2); said urethane prepolymer (a) having been derived from an excess non-aromatic diisocyanate (a1) and a diol component; said diol component comprising a high-molecular weight polyester diol (a2) of a dihydric alcohol with an aromatic dicarboxylic acid and having a number average molecular weight of about 500 to about 10,000, with a low-molecular weight diol (a3), wherein the molar ratio of (b1)/(b2) is 20/1 to 5/1.

15. The molded article of claim 14, wherein (b1) is at least one non-aromatic diamine selected from the group consisting of cycloaliphatic diamines and aliphatic diamines; and (b2) is at least one aliphatic monoamine selected from the group consisting of monoalkylamines, dialkylamines, monoalkanol amines and dialkanolamines.

16. A process for producing a molded article, which comprises slush-molding a composition comprising:
a thermoplastic polyurethane elastomer (A) having a number average molecular weight of about 10,000 to about 50,000 and mainly comprised of a diol component including an aromatic ring-containing diol and a non-aromatic diisocyanate; and a plasticizer (B); with or without an additive, wherein (A) is obtained by reacting an NCO-terminated urethane prepolymer (a) with a non-aromatic diamine (b1) and an aliphatic monoamine (b2); and urethane prepolymer (a) having been derived from an excess non-aromatic diisocyanate (a1) and a diol component; said diol component comprising a high-molecular weight polyester diol (a2) of a dihydric alcohol with an aromatic dicarboxylic acid, the dihydric alcohol being an oxyalkylene ether of a dihydric phenol, selected from the group consisiting of bisphenol A, bisphenol F, bisphenol S, catechol and hydroquinone, said diol (a2) having a number average molecular weight of about 500 to about 10,000, with or without a low-molecular weight diol (a3), wherein the molar ratio of (b1/b2) is 20/1 to 5/1.

17. The process of claim 16, wherein the polyurethane elastomer (A) has a heat softening initiation temperature of 120 to 200° C.

18. The process of claim 16, wherein the composition is in the form of a powder having an average particle diameter of 50 to 400 μm and containing not more than 50% by weight of fine particles less than 100 μm.

19. A process for producing a molded article, which comprises slush-molding a composition comprising:
a thermoplastic polyurethane elastomer (A) having a number average molecular weight of about 10,000 to about 50,000 and mainly comprised of a diol component including an aromatic ring-containing diol and a non-aromatic diisocyanate; and a plasticizer (B); with or without an additive, wherein (A) is obtained by reacting an NCO-terminated urethane prepolymer (a) with a non-aromatic diamine (b1) and an aliphatic monoamine (b2); said urethane prepolymer (a) having been derived from an excess non-aromatic diisocyanate (a1) and a diol component; said diol component comprising a high-molecular weight polyester diol (a2) of a dihydric alcohol with an aromatic dicarboxylic acid, the dihydric alcohol being an oxyalkylene ether of a dihydric phenol, selected from the group consisting of bisphenol A, bisphenol F, bisphenol S, catechol and hydroquinone, said diol (a2) having a number average molecular weight of about 500 to about 10,000, with or without a low-molecular weight diol (a3), wherein plasticizer (B) comprises an aromatic monocarboxylic acid ester of a polyalkylene glycol of the general formula $$R^1COO-[A-O-]_n-COR^2$$

in which $R^1$ and $R^2$ represent the same or different aromatic monocarboxylic acid residues from each other, A represents an alkylene group with two to four carbon atoms, and n is an integer of two to 25.

20. A process for producing a molded article, which comprises slush-molding a composition comprising:
a thermoplastic polyurethane elastomer (A) having a number average molecular weight of about 10,000 to about 50,000 and mainly comprised of a diol component including an aromatic ring-containing diol and a non-aromatic diisocyanate; and a plasticizer (B); with or without an additive, wherein (A) is obtained by reacting an NCO-terminated urethane prepolymer (a) with a non-aromatic diamine (b1) and an aliphatic monoamine (b2); said urethane prepolymer (a) having been derived from an excess non-aromatic diisocyanate (a1) and a diol component; said diol component comprising a high-molecular weight polyester diol (a2) of a dihydric alcohol with an aromatic dicarboxylic acid and having a number average molecular weight of about 500 to about 10,000, with a low molecular weight diol (a3), wherein (A) contains aromatic rings in an amount of 5 to 50% by weight.

21. A molded article, obtained by slush-molding a composition comprising:
a thermoplastic polyurethane elastomer (A) having a number average molecular weight of about 10,000 to about 50,000 and mainly comprised of a diol component including an aromatic ring-containing diol and a non-aromatic diisocyanate; and a plasticizer (B); with or without an additive, wherein (A) is obtained by reacting an NCO-terminated urethane prepolymer (a)

with a non-aromatic diamine (b1) and an aliphatic monoamine (b2); said urethane prepolymer (a) having been derived from an excess non-aromatic diisocyanate (a1) and a diol component; said diol component comprising a high-molecular weight polyester diol (a2) of an oxyalkylene ether of a dihydric phenol, selected from the group consisting of bisphenol A, bisphenol F, bisphenol S, catechol and hydroquinone with an aromatic dicarboxylic acid and having a number average molecular weight of about 500 to about 10,000, with or without a low-molecular weight diol (a3), wherein (A) contains aromatic rings in an amount of 5 to 50% by weight.

22. A molded article, obtained by slush-molding a composition comprising:

a thermoplastic polyurethane elastomer (A) having a number average molecular weight of about 10,000 to about 50,000 and mainly comprised of a diol component including an aromatic ring-containing diol and a non-aromatic diisocyanate; and a plasticizer (B) comprising an aromatic monocarboxylic acid ester of a polyalkylene glycol of the general formula $$R^1COO\text{---}[A\text{---}O\text{---}]_n\text{---}COR^2$$

in which $R^1$ and $R^2$ represent the same or different aromatic monocarboxylic acid residues from each other, A represents an alkylene group with two to four carbon atoms, and n is an integer of two to 25; with or without an additive, wherein (A) is obtained by reacting an NCO-terminated urethane prepolymer (a) with a non-aromatic diamine (b1) and an aliphatic monoamine (b2); said urethane prepolymer (a) having been derived from an excess non-aromatic diisocyanate (a1) and a diol component; said diol component comprising a high-molecular weight polyester diol (a2) of a dihydric alcohol with an aromatic dicarboxylic acid having a number average molecular weight of about 500 to about 10,000, with or without a low-molecular weight diol (a3).

23. A process for producing a molded article, which comprises slush-molding a composition consisting essentially of:

a thermoplastic polyurethane elastomer (A) having a number average molecular weight of about 10,000 to about 50,000 and mainly comprised of a diol component including an aromatic ring-containing diol and a non-aromatic diisocyanate, and a plasticizer (B); without any additive or with at least one additive selected from the group consisting of pigments, stabilizers, blocking inhibitors, releasing agents and flame retardants; wherein (A) is obtained by reacting an NCO-terminated urethane prepolymer (a) with a non-aromatic diamine (b1) and an aliphatic monoamine (b2); said urethane prepolymer (a) having been derived from an excess non-aromatic diisocyanate (a1) and a diol component; said diol component comprising a high-molecular weight polyester diol (a2) of a dihydric alcohol with an aromatic dicarboxylic acid and having a number average molecular weight of about 500 to about 10,000, with or without a low molecular weight diol (a3).

24. A molded article, obtained by the process of claim 23.

* * * * *

UNITED STATES PATENT AND TRADEMARK OFFICE
CERTIFICATE OF CORRECTION

PATENT NO. : 6,562,933 B2  
DATED : May 13, 2003  
INVENTOR(S) : Hideki Ohmori et al.

It is certified that error appears in the above-identified patent and that said Letters Patent is hereby corrected as shown below:

Column 12,
Line 64, "two to 18." should read -- two to 15. --.

Column 13,
Line 56, "and urethane prepolymer (a)" should read -- said urethane prepolymer (a) --.

Column 16,
Line 5, after "acid" and before "having", insert -- and --.

Signed and Sealed this

Seventeenth Day of February, 2004

JON W. DUDAS
*Acting Director of the United States Patent and Trademark Office*